(12) United States Patent
Hummer

(10) Patent No.: US 12,504,114 B2
(45) Date of Patent: Dec. 23, 2025

(54) MOVABLE STAND FOR AN EXTRUSION PUMP

(71) Applicant: MAAG GERMANY GmbH, Grossostheim (DE)

(72) Inventor: Jonathan Hummer, Weiach (DE)

(73) Assignee: MAAG GERMANY GMBH, Grossostheim (DE)

( * ) Notice: Subject to any disclaimer, the term of this patent is extended or adjusted under 35 U.S.C. 154(b) by 134 days.

(21) Appl. No.: 18/275,977

(22) PCT Filed: Feb. 4, 2022

(86) PCT No.: PCT/EP2022/052696
§ 371 (c)(1),
(2) Date: Aug. 4, 2023

(87) PCT Pub. No.: WO2022/167574
PCT Pub. Date: Aug. 11, 2022

(65) Prior Publication Data
US 2024/0117924 A1  Apr. 11, 2024

(30) Foreign Application Priority Data
Feb. 5, 2021 (DE) ............... 20 2021 100 587.4

(51) Int. Cl.
*F16M 11/00* (2006.01)
*F16M 11/26* (2006.01)
(Continued)

(52) U.S. Cl.
CPC ............. *F16M 11/26* (2013.01); *F16M 11/42* (2013.01); *B29C 48/265* (2019.02); *B29C 48/37* (2019.02); *F16M 2200/08* (2013.01)

(58) Field of Classification Search
CPC .... F16M 11/26; F16M 11/42; F16M 2200/08; B29C 48/265; B29C 48/37; B29C 48/252; B29C 48/2665
See application file for complete search history.

(56) References Cited

U.S. PATENT DOCUMENTS 4,560,151 A * 12/1985 Grundy ............... B66F 5/00
254/DIG. 16
5,433,593 A   7/1995 Berger
(Continued)

FOREIGN PATENT DOCUMENTS

CN    202787912 U    3/2013
CN    206130437 U    4/2017
(Continued)

OTHER PUBLICATIONS

PCT International Preliminary Report on Patentability mailed Aug. 3, 2023 issued in counterpart PCT Application No. PCT/EP022/052696, 7 pages in English.
(Continued)

*Primary Examiner* — Amy J. Sterling
(74) *Attorney, Agent, or Firm* — Juan Carlos A. Marquez; Marquez IP Law Office, PLLC

(57) ABSTRACT

The invention relates to a movable stand (16) for an extrusion pump (10) that has a drive (14) and a transmission (12), the stand comprising a horizontal stand platform (18, 20, 70), which has wheels (22), and comprising at least one carrier (32, 34), which extends vertically with respect to the stand platform (18, 20, 70) and is connected to a carrying body (40), wherein the carrying body (40) comprises: a support (50) for the extrusion pump (10) and a fine vertical adjustment device (48) for the support (50); a carrying wall (54), on which the unit consisting of the transmission (12) and drive (14) of the extrusion pump (10) is fastened; and a housing (60), which surrounds a shaft (58) connecting the
(Continued)

transmission (12) to the extrusion pump (10). The invention is characterised in that the carrying body (40) as a whole is detachably connected to the stand platform (18, 20, 70) only via the carrier (32, 34) and can be vertically adjusted with respect to the stand platform (18, 20, 70), in particular with respect to the carrier (32, 34).

20 Claims, 4 Drawing Sheets

(51) Int. Cl.
*F16M 11/42* (2006.01)
*B29C 48/265* (2019.01)
*B29C 48/37* (2019.01)

(56) References Cited

U.S. PATENT DOCUMENTS

| | | | | |
|---|---|---|---|---|
| 6,502,977 B1* | 1/2003 | Capelle | ........... | B29C 48/37 |
| | | | | 366/100 |
| 6,581,913 B1* | 6/2003 | Conomos | ........... | B66F 3/247 |
| | | | | 254/133 R |
| 6,955,734 B2 | 10/2005 | Ogawa | | |
| 7,438,106 B2 | 10/2008 | Ogawa | | |

FOREIGN PATENT DOCUMENTS

| | | |
|---|---|---|
| CN | 209903865 U | 1/2020 |
| CN | 110789092 A | 2/2020 |
| CN | 210453659 U | 5/2020 |
| CN | 211251294 U | 8/2020 |
| EP | 1279486 A2 | 1/2003 |
| JP | 2002331562 A | 11/2002 |

OTHER PUBLICATIONS

PCT International Search Report mailed May 13, 2022 issued in counterpart PCT Application No. PCT/EP022/052696, 2 pages in English.

PCT International Search Report and Written Opinion mailed May 13, 2022 issued in counterpart PCT Application No. PCT/EP022/052696, 14 pages in German.

German Search Report mailed Aug. 10, 2021 issued in counterpart German application DE 20 2021 100 587.4, 4 pages in German.

Taiwan office action and search report mailed Aug. 5, 2025 in counterpart Taiwanese application TW111104416, 15 pages in Chinese.

Taiwan office action and search report mailed Aug. 5, 2025 in counterpart Taiwanese application TW111104416, 17 pages in English.

* cited by examiner

MOVABLE STAND FOR AN EXTRUSION PUMP

This application is a national stage application filed under 35 U.S.C 371 of International Application No. PCT Application No. PCT/EP022/052696 filed Feb. 4, 2022, which claims priority to German Patent Application No. 20 2021 100587.4 filed Feb. 5, 2021. The disclosures of the above applications are incorporated herein by reference in their entireties.

The invention relates to a movable stand for an extrusion pump that has a drive and a gearbox, of the type specified in the preamble of claim 1.

It is known to support an extrusion pump that has a drive and a gearbox on a movable stand. This prior art movable stand has four wheels, which are adjustable in height and form a horizontal stand platform in a welded construction. A carrier, which extends vertically with respect to the stand platform, is welded onto the stand platform, with a support for the extrusion pump being provided at the free end of the carrier and a fine vertical adjustment device being arranged under the support.

This fine vertical adjustment device consists of a carrying plate that interacts with the support, with the support being screw-connected to the extrusion pump. The support has four threaded rods that engage in corresponding holes in the carrying plate of the carrier. The support can be vertically adjusted by means of threaded nuts provided on both sides of the carrying plate on one threaded rod each. For this purpose, the threaded nuts are rotated on the threaded rods. This can be used for easy vertical adjustment upwards or downwards of the support of the extrusion pump connected thereto, depending on the direction of rotation of the threaded nuts. The vertical adjustment range for the support by means of the fine vertical adjustment device is between 1.0 mm and 10 mm.

The movable stand has a cross beam welded to a carrying wall which is vertically welded to the stand platform and the vertical carrier. The gearbox of the extrusion pump is screw-connected to the carrying wall, and the gearbox is in turn connected to the electric motor which is used to drive the pump. The gearbox and the motor connected thereto are located on the side of the carrying wall that faces away from the extrusion pump, and form a structural unit. The carrying wall alone carries the gearbox and the electric motor.

A drive shaft connects the extrusion pump to the gearbox. The extrusion pump is driven via the drive shaft. In its extent between the extrusion pump and the carrying wall, the drive shaft is covered by a housing. The housing is connected to the carrying wall on the side remote from the gearbox. In the area of the end remote from the carrying wall, the housing is welded to the cross beam all along its base via a support rod.

The cross beam, carrying wall, support and housing in combination form a carrying body for the extrusion pump with its gearbox, drive and drive shaft.

However, a drawback of prior art movable stands for extrusion pumps with gearbox and drive is that they need to be manufactured individually not only for each installation situation, but also for each type of extrusion pump, and then again for each type of gearbox and drive. This is very complex and time-consuming. As a result, a wide variety of movable stands which are adapted to the dimensions and the desired installation situations of the extrusion pump must always be kept in stock.

It is the object of the present invention to develop a movable stand for extrusion pumps of the type specified in the preamble of claim 1 in such a way that it can be used for various different installation situations, and that it allows different types of extrusion pumps, gearboxes and motors having different dimensions to be easily mounted on a single type of movable stand, while avoiding the drawbacks mentioned above.

This object is accomplished by the characterizing features of claim 1 in conjunction with the features of its preamble.

The dependent claims relate to advantageous further embodiments of the invention.

The invention is based on the realization that, if the carrying body forms a unit and is vertically adjustable in its entirety with respect to the movable stand platform, the same design of a movable stand can be used for different installation situations and different extrusion pumps, without the need for specifically designed versions of movable stands. This will ultimately allow almost any type of extrusion pump to be arranged on one kind of movable stand in different installation situations.

Therefore, the present invention provides for the carrying body as a whole to be detachably connected to the movable stand platform only via the carrier, and is vertically adjustable with respect to the stand platform, in particular relative to the carrier connected to the stand platform. The vertical adjustability of the structural unit of the carrying body, on which the extrusion pump with its electric motor, gearbox and drive shaft is arranged, allows it to be adapted easily to the necessary height levels, for example, in order to connect the extrusion pump to a piping system, to account for different installation situations, or to adapt the movable stand to the dimensions of the unit consisting of extrusion pump, drive shaft, gearbox and drive.

Preferably, the carrying body with the extrusion pump, the drive shaft, the gearbox and the drive can be arranged in at least two different orientations relative to the stand platform. In confined spaces, for example, it may be advantageous for the longitudinal axis of the drive and the gearbox to extend vertically, so that less space is required in the horizontal direction. Horizontal alignment of the longitudinal axis of the drive and the gearbox can be useful, for example, when it is desired to design a low-height movable stand with extrusion pump. In addition, the installation situations can also be defined by the dimensions of the extrusion pump and/or by the installation height due to a given pipe network in which the extrusion pump is to be installed.

In order to be able to compensate for different distances between the gearbox and the extrusion pump, and thus for different lengths of the drive shaft, the housing is of a telescopic design, thus allowing the length of the housing to be increased and decreased as needed.

In one embodiment of the invention, the vertical carrier is provided with a plurality of connecting means arranged the one above the other, in particular at a uniform distance from one another, which are associated with connecting means of the carrying body.

The connecting means of the carrying body can be constituted by bolts and nuts, and the connecting means of the carrier can be constituted by holes.

The carrying body can also have a carrying base which extends away from the carrying wall on the side remote from the gearbox and the drive at an angle, in particular essentially perpendicular, with respect to the carrying wall, the support with the fine vertical adjustment device for the extrusion pump being provided at the free end of the carrying base. The carrying base eliminates the need for the cross beam of the prior art, and opens up additional design possibilities, as will be discussed below.

In particular, the carrying base is flush with the support on the side remote from the housing, or it extends beyond the support, depending on the design of the extrusion pump with its drive shaft.

The housing may be arranged on the carrying base. This eliminates the need for additional support devices for the housing.

At least part of the sidewalls of the housing is connected to the carrying base, in particular integrally connected to it in one piece. This increases the stability of the carrying body.

Via its sidewalls, in particular via the part of the housing sidewalls connected to the carrying base, the carrying body is connected to the vertical carrier, in particular is connected to a vertical carrier on each side. This not only makes for stable transmission of force and for stability of the movable stand, but also allows for the different ways of aligning the carrying body with the extrusion pump.

In one embodiment of the invention, the carrying base, in particular also the housing sidewalls that are connected to the carrying base, tapers towards its free end, in particular evenly—in a V-shape in top view of the carrying base. Thus, for example, an isosceles trapezoid is formed. This opens up a range of design options, as will be explained below.

Preferably, the vertical carrier is detachably connected to the stand platform. This allows the use of carriers of different lengths, depending on the maximum height required.

To ensure a safe and stable arrangement in all cases, two vertical carriers are provided, which each have the same structure.

In one embodiment of the invention, the stand platform comprises two horizontal stand carriers each having two detachably arranged wheels. The stand carriers are connected to one another at least via the carrying body and the carrier. This results in further possibilities of assembly, which yield a compact movable stand, and at the same time make for high stability of the movable stand.

Preferably, the wheels of the stand platform are adjustable with regard to the vertical distance from the stand platform—height—as well as with regard to the distance transverse to the longitudinal direction—width. This opens up further possibilities for fine adjustment of the extrusion pump.

A compact design is also made possible by the fact that the distance between the stand carriers is greater than the maximum extent of the drive transverse to its longitudinal axis.

The carrying body can preferably be arranged on the carrier(s) at least at a height that is greater than the maximum extent of the drive and gearbox along the longitudinal axis.

In addition, plural pairs of carriers, each having a different vertical extent, may be provided to provide the maximum desired heights of the extrusion pump as needed.

In one embodiment of the invention, the movable stand is symmetrical in relation to its longitudinal median plane.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below. In the drawings, FIG. 1 is a perspective view—as seen at an angle from above—of an extrusion pump with drive shaft, gearbox and drive motor on a movable stand according to one embodiment of the invention, in a first installation position thereof;

Figure 1:
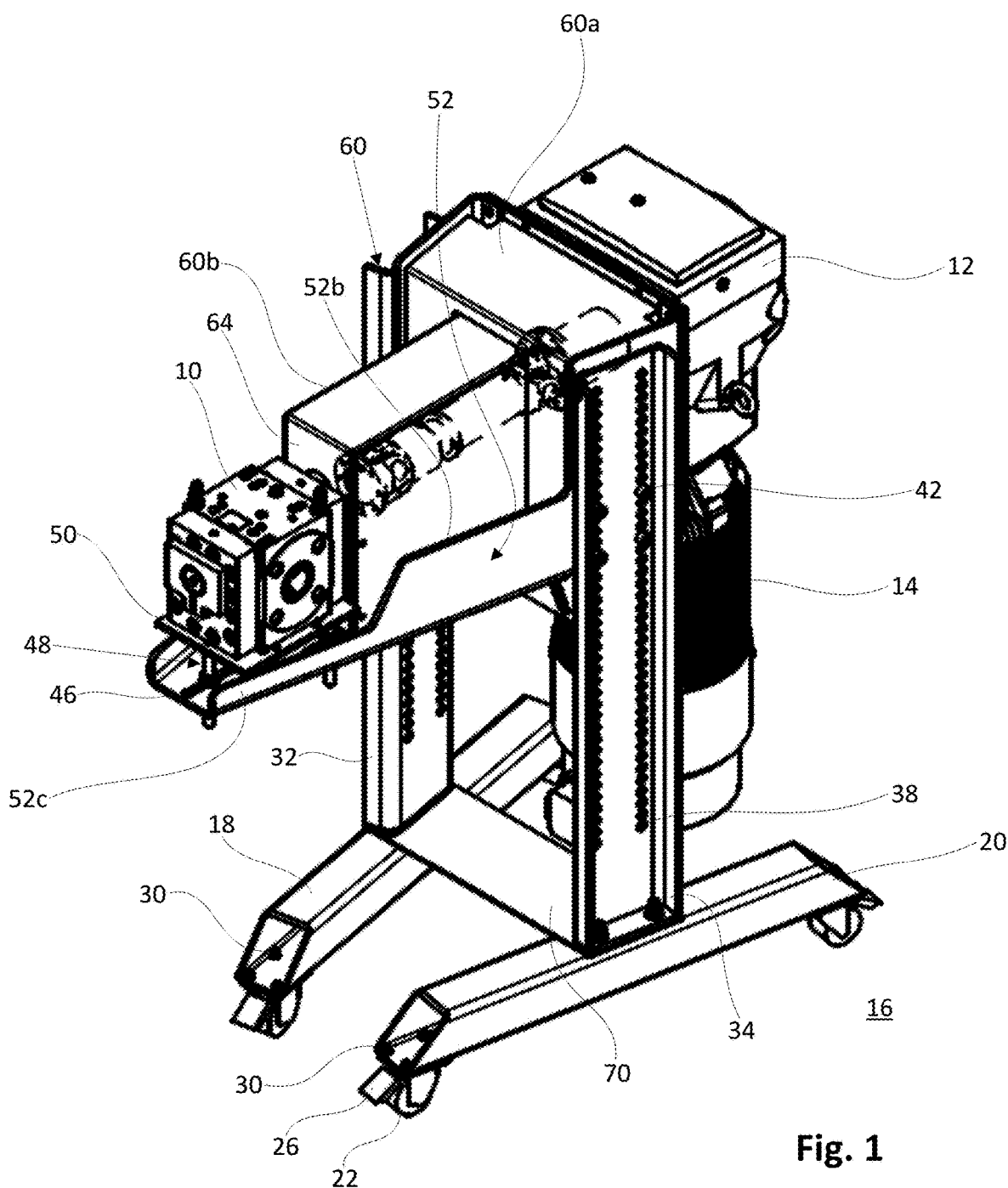
Figure 2:
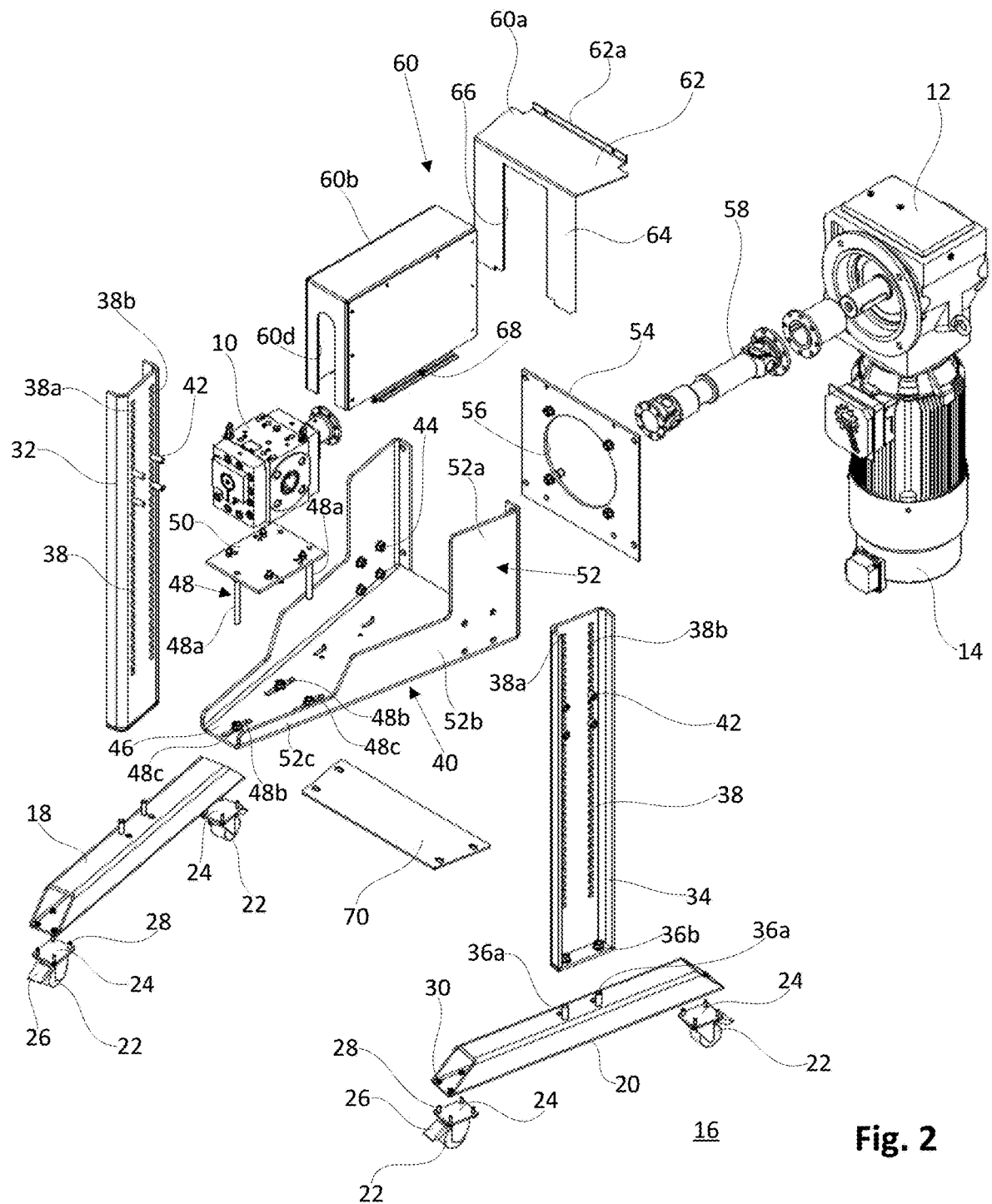
FIG. 2 is an exploded view of FIG. 1.
Figure 3:
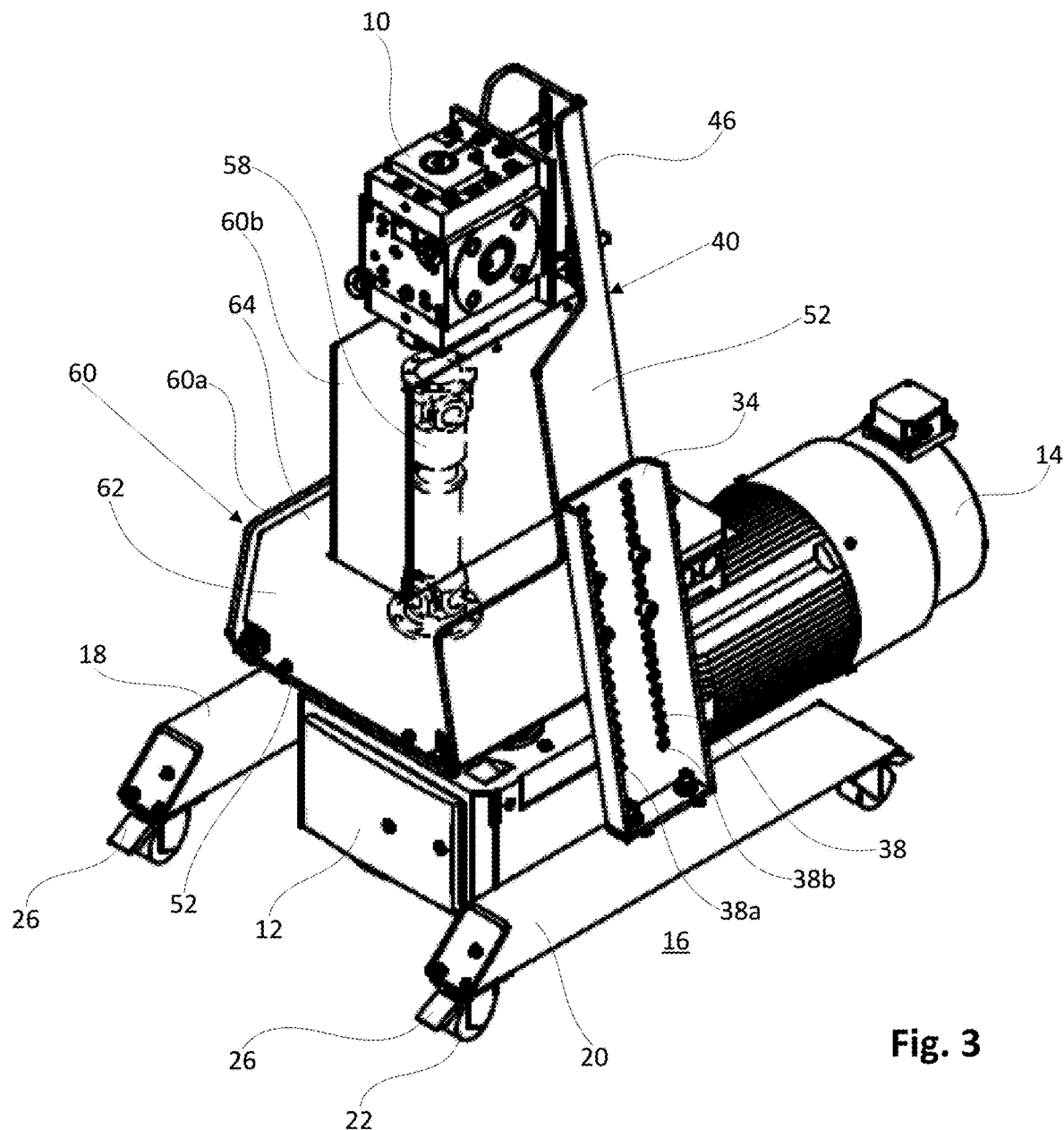
FIG. 3 is a perspective view—as seen at an angle from above—of the extrusion pump with drive shaft, gearbox and drive motor on a movable stand according to the embodiment of the invention, in a second installation position thereof.
Figure 4:
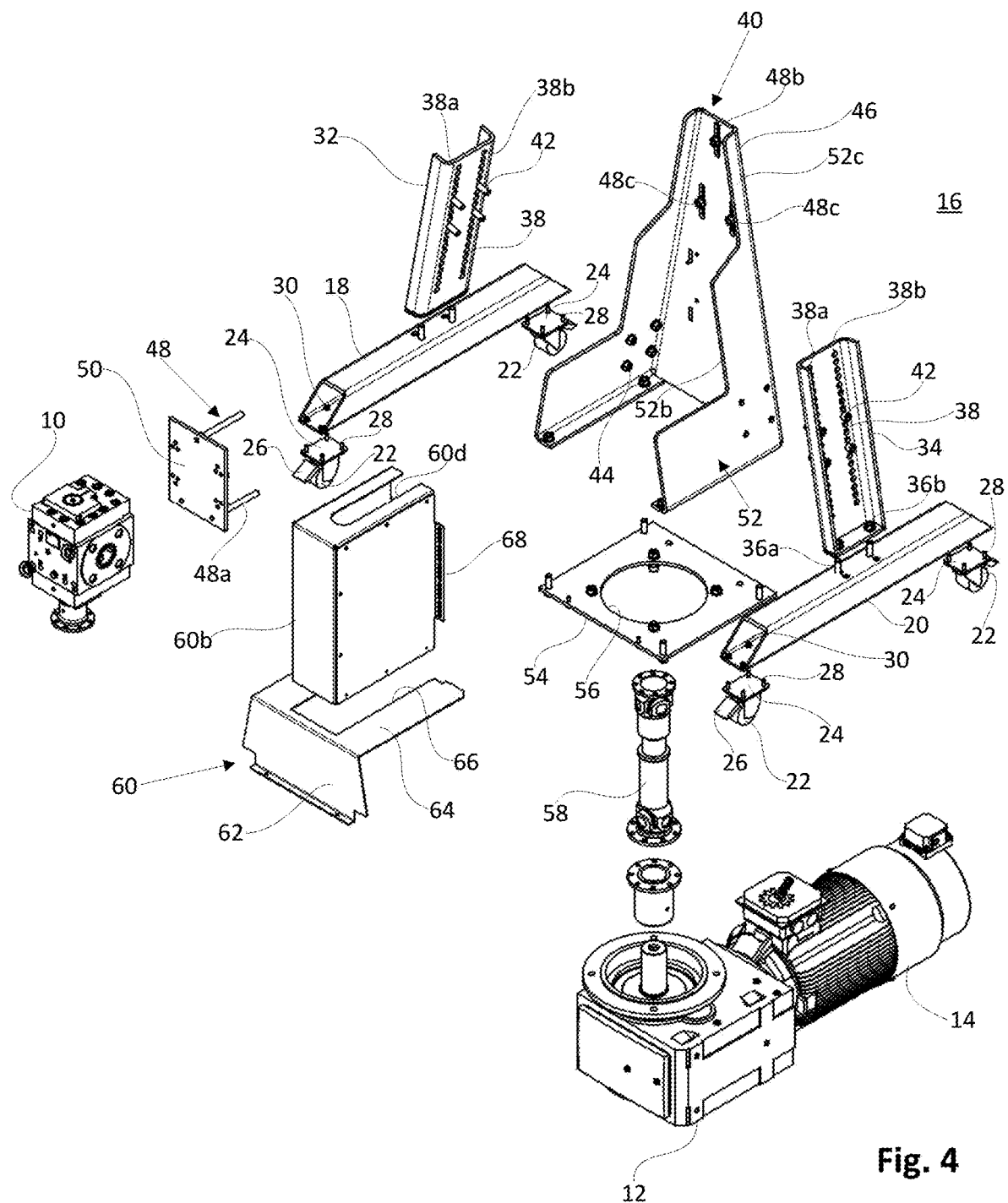
FIG. 4 is an exploded view of FIG. 3.

The views of FIGS. 1 and 2 show an extrusion pump 10 with a gearbox 12 and an electric motor 14 on a movable stand 16 in a first installation position thereof, and the views of FIGS. 3 and 4 show the extrusion pump 10 with the gearbox 12 and the electric motor 14 on the movable stand 16 in a second installation position thereof.

The movable stand 16 is provided with two stand carriers 18 and 20, at the free end of each wheels 22 are mounted that are vertically adjustable, i.e. with respect to each stand carrier 18, 20. The wheels 22 are mounted in a carrying plate 24 so as to be rotatable about an axis of rotation and are provided with a locking brake 26. The axis of rotation extends substantially perpendicular to the carrying plate 24. The carrying plate 24 has four threaded rods 28 that engage in holes in the stand carrier 18, 20. Threaded nuts 30 arranged on both sides of the stand carrier 18, 20 and on the threaded rod 28 allow the carrying plate 24 and thus the wheel 22 each to be vertically adjusted.

A vertical carrier 32, 34 is mounted approximately centrally on each stand carrier 18, 20. For this purpose, the stand carrier 18, 20 has two threaded pins 36a, which engage in corresponding bores of the vertical carrier 32, 34 at its lower end and are retained in place by threaded nuts 36b.

The vertical carrier 32, 34 each has two rows 38a, 38b of holes 38 arranged the one above the other and equidistant from one another, for mounting a carrying body 40 between the vertical carriers 32, 34. Depending on the desired height, the carrying body 40 is mounted using four bolt 42/nut 44 connections through the holes 38 of the vertical carrier 32, 34. In this case, two bolts 42 are inserted into bores 38, which are arranged the one above the other, of a first row 38a of the vertical carrier 32, 34, and two bolts 42 are inserted into bores 38, which are arranged the one above the other, of a second row 38b of the vertical carrier 32, 34 and retained in place by nuts 44.

The carrying body 40 includes a carrying base 46 which, as viewed from above, forms an isosceles trapezoid and tapers toward its free end.

A fine vertical adjustment device 48 and a support 50 connected to the extrusion pump 10 are provided at the free end. The fine vertical adjustment device 48 comprises three threaded pins 48a, which engage in elongated holes 48b of the carrying base 46 in the area of its free end. The threaded pins 48a are firmly connected to the support 50. Threaded nuts 48c on either side of the carrying base 46 are used to fix the threaded pins 48a in place, and rotating the threaded nuts 48c in one direction or the other can change the height of the support 50 in one direction or the other, allowing for fine vertical adjustment of the support 50 and thus of the extrusion pump 10. The adjustment range is between 1 mm and 10 mm approximately. In addition, the fine vertical adjustment device 48 can be used to displace the support 50 in the longitudinal direction of the carrying base 46 via the elongated holes 48b as required, in order to compensate for the different distances between the extrusion pump 10 and the gearbox 12.

A sidewall 52 extending perpendicular to the carrying base 46 is provided on each side of the carrying base 46. Sidewall 52 has three parts 52a, 52b and 52c. Of these, part 52a extends furthest away from the carrying base 46 and forms the sidewall of a first housing part 54. Adjacent to this, in the direction of the free end of the carrying base 46, is the next part 52b, which has an extent in a direction away from the carrying base 46 that corresponds approximately to the width of the vertical carrier 32, 34 and is smaller than the first part 52a of sidewall 52. The third part 52c delimits the support 50 with the fine vertical adjustment device 48 and extends away from the carrying base 46 only slightly enough so that, even when the support 50 is in its maximum extended position relative to the carrying base 46, the support 50 will still be covered laterally by the fine vertical adjustment device 48. Sidewall 52 thus decreases in height in two steps towards the free end.

On the side remote from the free end of the carrying base 46 of the carrying body 40, a carrying wall 54 is screw-connected to an inwardly bent ledge 52d of the first part 52a of sidewall 52. Carrying wall 54 has a central circular recess 56 made therein through which a drive shaft 58 extends that connects the extrusion pump 10 to the gearbox 12. The carrying wall 54 forms the rear wall of a housing 60 that surrounds the drive shaft 58. On the side of the carrying wall 54 facing away from the carrying base 46, the gearbox 12 is screw-connected to the carrying wall 54. The electric motor 14 is arranged below the gearbox 12 to drive the extrusion pump. Electric motor 14 and gearbox 12 have a longitudinal axis that is substantially vertical to a contact surface of the wheels 22. The gearbox 12 and the electric motor 14 are carried solely by the carrying wall 54.

A housing cover 62 extends up to the carrying wall 54 towards the free end along the length of the first part 52a of sidewall 52. At the end of the first part, a housing end wall 64 extends substantially perpendicularly toward the carrying base 46. The housing cover 62 and the housing end wall 64 are formed in one piece. The housing end wall 64 has a rectangular recess 66 made therein. The housing cover 62 is screw-connected to the carrying wall 54 via a bent ledge 62a.

The carrying wall 54, the first part 52a of sidewall 52, the housing top 62, and the housing end wall 64 form a first fixed housing part 60a of housing 60.

A second rectangular housing part 60b is slidably mounted on the carrying base 46 via slide rails 68 relative to the first housing part 60a. The second housing part 60b is open to the carrying base 46 and its sidewalls 60c engage the slide rails 68. A recess 60d for the drive shaft 58 is made in each end face of the second housing part 60b.

The cross-section of the second housing part 60b corresponds approximately to the recess 66 of the first housing part 60a. The second housing part 60b is slidable relative to the first housing part 60a. For this purpose, the length of the second housing part 60b is such that a portion of the second housing part 60b will always remain within the first housing part. The housing 60 is thus designed to be telescopic. This can compensate for varying lengths of drive shafts 58 and different distances between the extrusion pump 10 and the gearbox 12.

FIGS. 3 and 4 are views of a different installation situation. The parts used are identical, except for the length of the vertical carriers 32, 34. However, the carrying body 40 is attached to the vertical carriers 32, 34 rotated by 90°. As a result, the longitudinal axes of electric motor 14 and gearbox 12 are aligned horizontally and the drive shaft 58 is aligned vertically. Because of the V-shape, each vertical carrier 32, 34 is inclined inwardly together with the associated stand carrier 18, 20, and the stand carriers 18, 20 are aligned parallel to each other.

In the installation situation as seen in FIGS. 1 and 2, a stabilizing wall 70 connects the stand carriers 18, 20 to each other below the vertical carrier. There is no such wall 70 in the installation situation shown in FIGS. 3 and 4.

In addition, the shorter vertical carrier 18, 20 of FIGS. 3 and 4 can also be used in addition to the longer vertical carriers 18, 20. The vertical carriers 18, 20 are U-shaped in cross-section and can be inserted into each other and thus stabilize each other.

The extrusion pump 10 is designed in particular as a gear pump.

Due to the modular design, different installation situations are made possible with one type of movable stand 16, and extrusion pumps 10 of different dimensions with a drive shaft 58, gearbox 12 and electric motor 14 can also be mounted thereon. Individually manufactured movable stands are thus no longer necessary.

LIST OF REFERENCE SIGNS 10 extrusion pump
12 gearbox
14 electric motor
16 movable stand
18 left-hand stand carrier
20 right-hand stand carrier
22 wheel(s)
24 carrying plate for mounting wheel 22 to stand carrier 18, 20
26 locking brake for wheel 22
28 threaded rod for fastening wheel 22
30 threaded nut for fastening wheel 22
32 left-hand vertical carrier
34 right-hand vertical carrier
36a threaded pins of stand carrier 18, 20
36b threaded nut for fastening vertical carrier 32, 34
38 holes for fastening carrying body 40
38a first row of holes 38
36b second row of holes 38
40 carrying body
42 bolt for fastening carrying body 40
44 threaded nut for fastening carrying body 40
46 carrying base
48 fine vertical adjustment device
48a threaded pin of fine vertical adjustment device 48
48b oblong hole in carrying base 46 of fine vertical adjustment device 48
48c threaded nut of fine vertical adjustment device 48
50 support for extrusion pump 10
52 sidewall
52a first part of sidewall 52
52b second part of sidewall 52
52c third part of sidewall 52
54 carrying wall
56 circular recess
58 drive shaft
60 housing
60a first housing part
60b second housing part
60c sidewall of second housing part 60b
60d recess in second housing part 60b
62 housing cover of first housing part 60a
62a ledge of housing cover 62
64 housing end wall of first housing part 60a
66 rectangular recess in first housing part 60a
68 slide rails 70 stabilizing wall which connects the two stand carriers 18, 20 to one another

The invention claimed is:

1. A movable stand for an extrusion pump that has a drive and a gearbox, which stand comprises:
   a horizontal stand platform, which has wheels,
   at least one carrier, which extends vertically with respect to the stand platform and is connected to a carrying body, which carrying body in turn comprises:
   a support for the extrusion pump and a fine vertical adjustment device for the support;
   a carrying wall, where the structural unit consisting of the gearbox and the drive are fixed on an opposite side from where the extrusion pump is fastened;
   and a housing, which surrounds a shaft that connects the gearbox to the extrusion pump
   wherein the carrying body as a whole is detachably connected to the stand platform only via the carrier and can be vertically adjusted with respect to the stand platform.

2. A movable stand according to claim 1, wherein the carrying body is adapted to be arranged in at least two different orientations with respect to the stand platform.

3. A movable stand according to claim 1, wherein the housing is designed to be telescopic in order to compensate for different lengths of shafts between the gearbox and the extrusion pump.

4. A movable stand according to claim 1, wherein the vertical carrier has a plurality of connecting means arranged the one above the other, at a uniform distance from one another, which connecting means are associated with connecting means of the carrying body.

5. A movable stand according to claim 4, wherein the connecting means of the carrying body are constituted by bolts and nuts, and the connecting means of the carrier are constituted by bores.

6. A movable stand according to claim 1, wherein the carrying body has a carrying base that extends away from the carrying wall on the side remote from the gearbox and the drive in a manner substantially perpendicular to the carrying wall, with the support with the fine vertical adjustment device being provided at the free end of the carrying base.

7. A movable stand according to claim 6, wherein the carrying base is flush with the support on the side remote from the housing, or it extends beyond the support.

8. A movable stand according to claim 6, wherein the housing is arranged on the carrying base.

9. A movable stand according to claim 8, wherein a part of the housing sidewalls is connected to the carrying base, which in particular are materially connected thereto as one piece.

10. A movable stand according to claim 9, wherein the carrying body is connected to the vertical carrier, in particular is connected to a vertical carrier on each side, via sidewalls, in particular via the part of the housing sidewalls that is connected to the carrying base.

11. A movable stand according to claim 9, wherein the carrying base, in particular also the housing sidewalls that are connected to the carrying base, tapers or taper in the direction of its free end, in particular evenly—in a V-shape in top view of the carrying base.

12. A movable stand according to claim 1, wherein said vertical carrier is detachably connected to the stand platform.

13. A movable stand according to claim 1, wherein two vertical carriers are provided, each of identical design.

14. A movable stand according to claim 1, wherein the stand platform has two horizontal stand carriers each having two detachably mounted wheels which are connected to each other at least via the carrying body and the carrier.

15. A movable stand according to claim 1, wherein the wheels of the stand platform are adjustable with respect to the vertical distance from the stand platform—height—and to the distance transverse to the longitudinal direction of the stand platform—width.

16. A movable stand according to claim 14, wherein the distance between the stand carriers is greater than the maximum extent of the drive transverse to its longitudinal axis.

17. A movable stand according to claim 1, wherein the carrying body is adapted to be arranged on the carrier or carriers at least at a height which is greater than the maximum extent of the drive and gearbox along the longitudinal axis.

18. A movable stand according to claim 1, wherein plural sets of pairs of carriers of different lengths are provided.

19. A movable stand according to claim 1, wherein the stand is symmetrical about its longitudinal median plane.

20. A movable stand according to claim 6, wherein the support is adjustable along the carrying base.

* * * * *